No. 647,413. Patented Apr. 10, 1900.
M. C. JOHNSON.
MACHINE FOR SHARPENING TWIST DRILLS.
(Application filed Aug. 5, 1898.)
(No Model.) 5 Sheets—Sheet 2.

Witnesses:
E. W. Fothergill.
E. J. Hyde.

Inventor:
Moses C. Johnson,
by Harry T. Williams,
Atty.

No. 647,413. Patented Apr. 10, 1900.
M. C. JOHNSON.
MACHINE FOR SHARPENING TWIST DRILLS.
(Application filed Aug. 5, 1898.)
(No Model.) 5 Sheets—Sheet 3.

Witnesses:
E. W. Fothergill.
E. J. Hyde.

Inventor:
Moses C. Johnson, by
Harry R. Williams,
Atty.

No. 647,413. Patented Apr. 10, 1900.
M. C. JOHNSON.
MACHINE FOR SHARPENING TWIST DRILLS.
(Application filed Aug. 5, 1898.)
(No Model.) 5 Sheets—Sheet 4.

Witnesses:
E. W. Fothergill.
E. J. Hyde.

Inventor:
Moses C. Johnson, by
Harry R. Williams,
atty.

No. 647,413. Patented Apr. 10, 1900.
M. C. JOHNSON.
MACHINE FOR SHARPENING TWIST DRILLS.
(Application filed Aug. 5, 1898.)
(No Model.) 5 Sheets—Sheet 5.
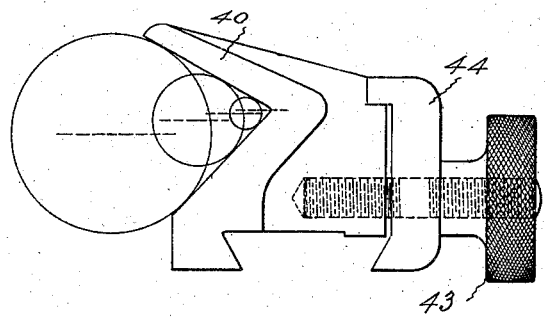
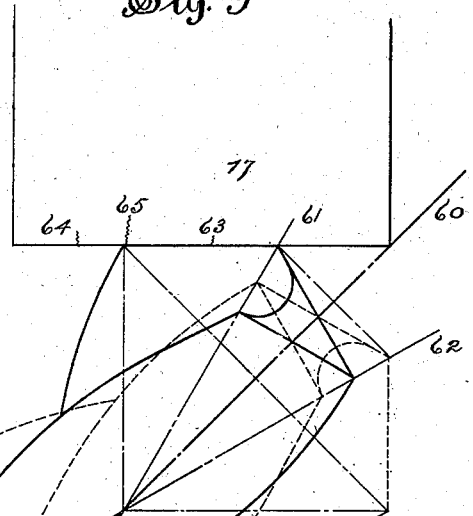
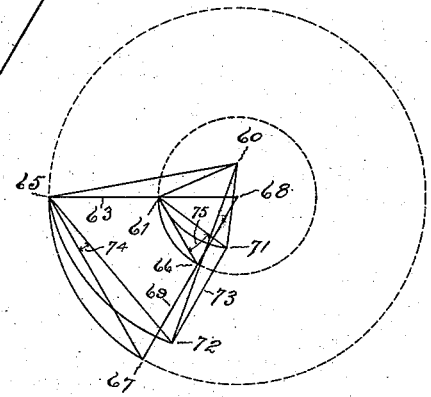
Witnesses:
E. W. Fothergill.
E. J. Hyde.
Inventor:
Moses C. Johnson, by
Harry R. Williams,
atty.

UNITED STATES PATENT OFFICE.

MOSES C. JOHNSON, OF HARTFORD, CONNECTICUT, ASSIGNOR TO THE WHITNEY MANUFACTURING COMPANY, OF SAME PLACE.

MACHINE FOR SHARPENING TWIST-DRILLS.

SPECIFICATION forming part of Letters Patent No. 647,413, dated April 10, 1900.

Application filed August 5, 1898. Serial No. 687,839. (No model.)

*To all whom it may concern:*

Be it known that I, MOSES C. JOHNSON, a citizen of the United States, residing at Hartford, in the county of Hartford and State of Connecticut, have invented certain new and useful Improvements in Machines for Sharpening Twist-Drills, of which the following is a specification.

This invention relates to a machine for regrinding the cutting-lips of twist-drills that have been dulled by use.

The object of the invention is to provide a simple and convenient machine in which twist-drills of many different sizes may be quickly placed and accurately ground, so that their cutting-lips will have the most desirable shape for efficient service.

The machine embodying this invention, which is illustrated in the accompanying drawings, has a bed, a slide that is movable on the bed toward and from the front and back, a carriage that is movable on the slide from side to side, a rotatable grinding-wheel that is mounted upon the carriage, and connections whereby the wheel when in use may be kept wet. The bed also supports a swinging frame that bears adjustable jaws for grasping and holding the drills of various diameters that are to be ground with their axes oblique to the periphery of the grinding-wheel and out of the plane of the axis of the swinging frame.

Figure 1:
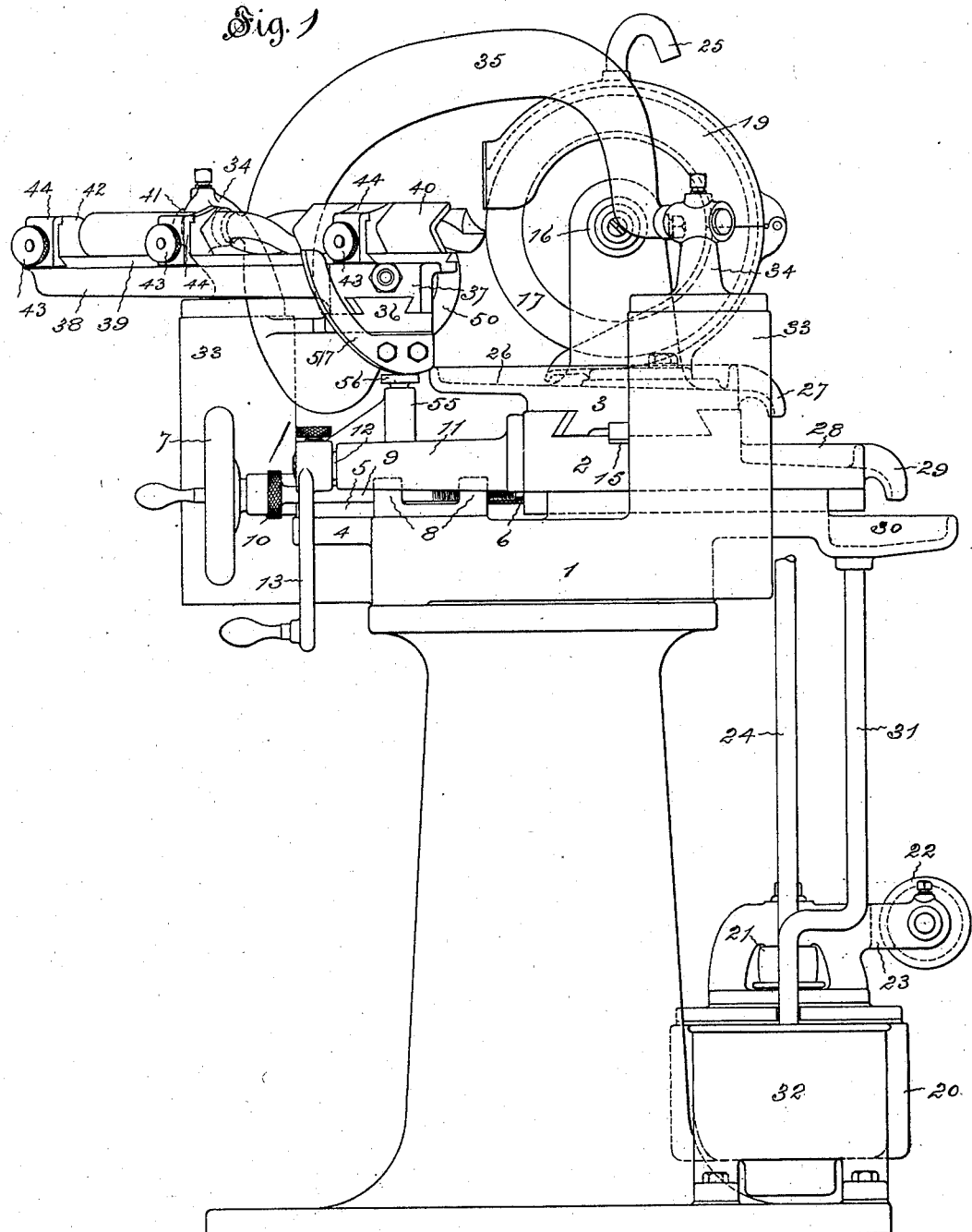
Figure 2:
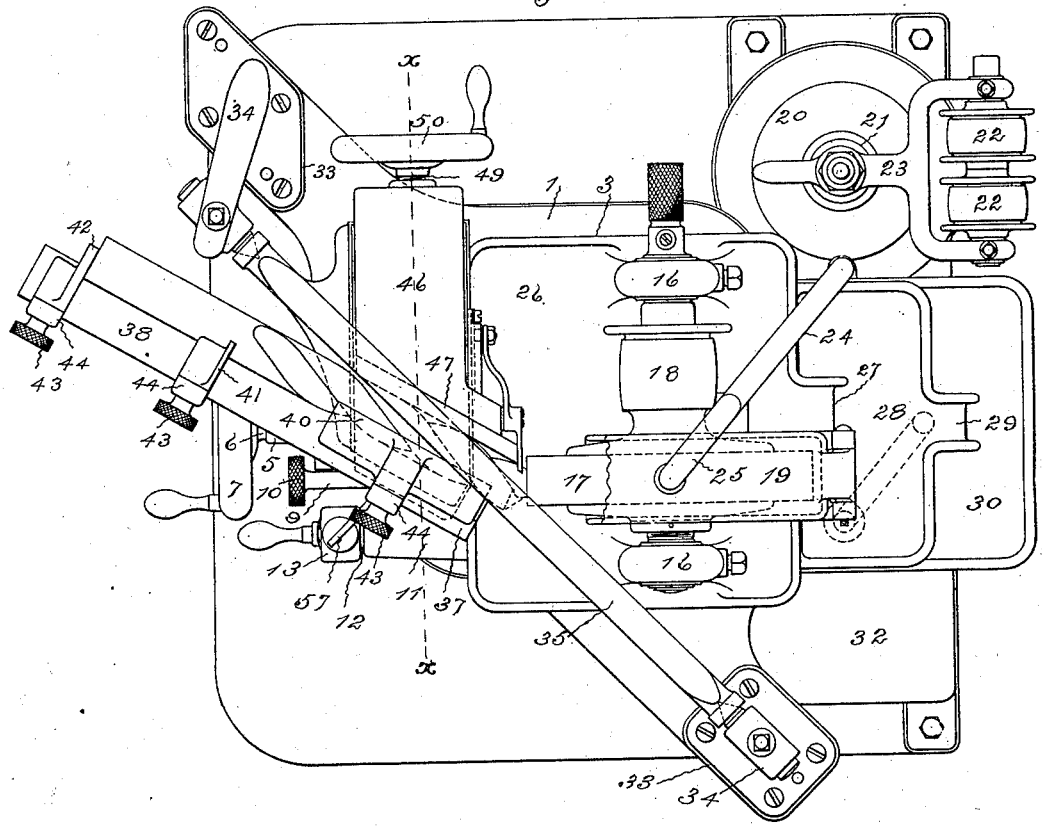
Figure 7:
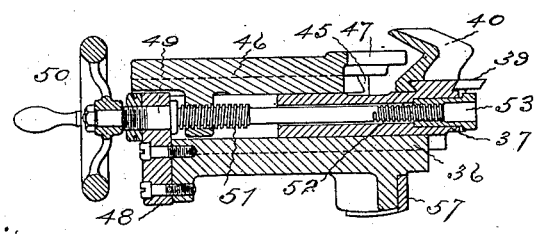
Figure 3:
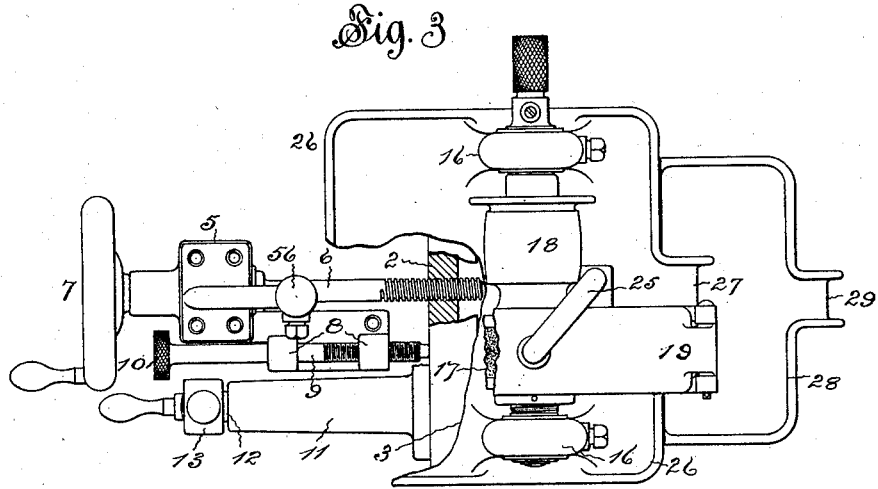
Figure 4:
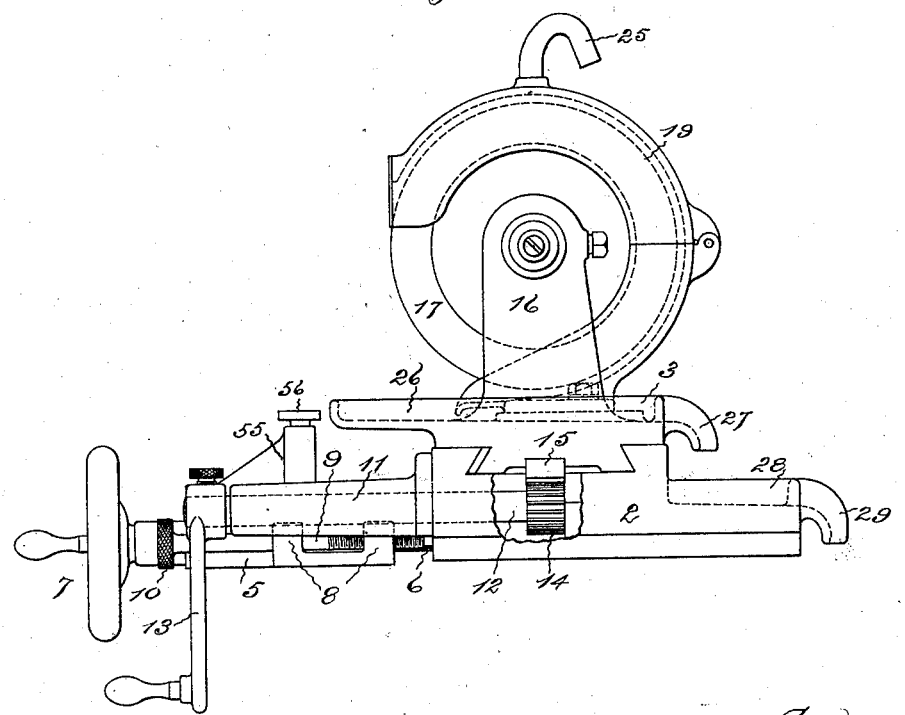
Figure 5:
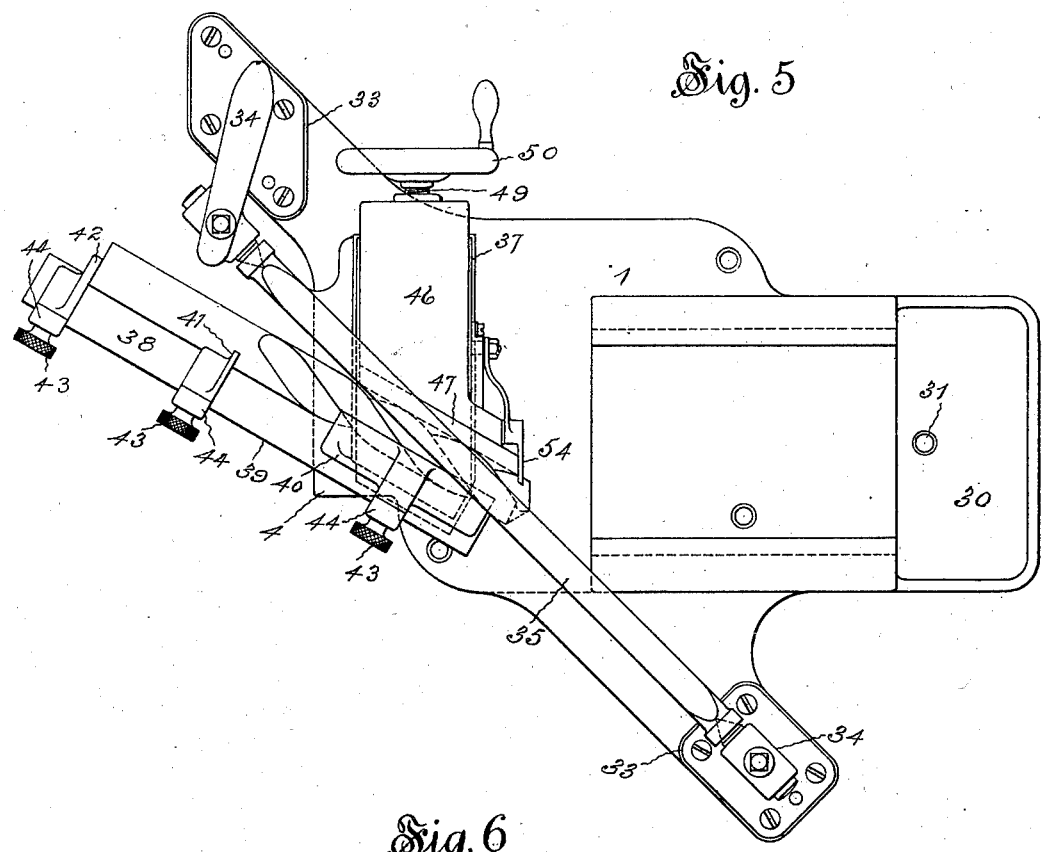
Figure 6:
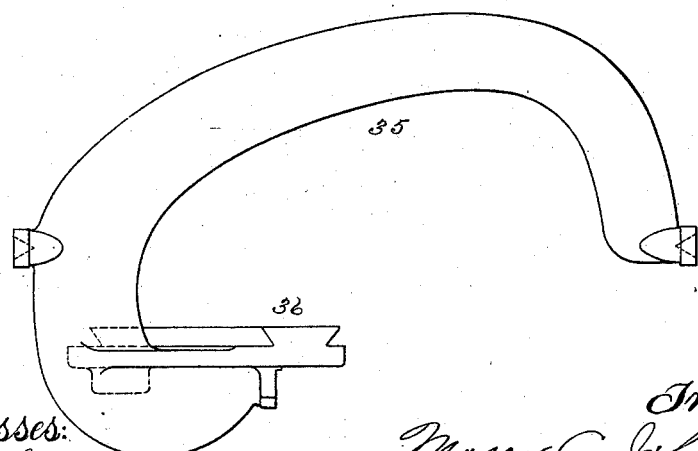

Figure 1 of the drawings shows a side elevation of such a machine. Fig. 2 shows a plan of the machine. Fig. 3 shows a plan of the grinding-wheel carriage with parts broken away to illustrate the means by which the grinding-wheel may be adjusted toward and from the front. Fig. 4 is a side elevation of the grinding-wheel carriage with parts broken away to illustrate the means by which the grinding-wheel may be adjusted sidewise. Fig. 5 is a plan of the bed and the swinging frame with the drill-holding jaws. Fig. 6 is a side view of the swinging frame. Fig. 7 is a vertical section of the drill-holding jaws, showing the means for opening and closing, the section being taken on the plane indicated by the dotted line $x$ $x$ of Fig. 2. Fig. 8 is a larger view of the angular holding-jaw, illustrating the positions occupied by drills of different diameters. Fig. 9 is a diagrammatic view illustrating the movement relatively to the grinding-wheel of a two-inch drill held by the swinging frame, and Fig. 10 is a diagram indicating the manner in which the cutting-lips of a two-inch drill would be ground and cleared on this machine.

The bed 1 may be mounted upon a column of any suitable design. Upon the upper face of the bed there is an ordinary dovetail guideway, and held by this guideway so that it may be moved from back to front is a slide 2. This slide upon its upper face has a similar guideway that extends at right angles with the guideway upon the bed, and held by this guideway on the slide is a carriage 3, Fig. 1.

A ledge 4 projects from the front of the bed, and secured to this is a block 5. Supported against longitudinal movement in a perforation in this block is a spindle 6, that on its outer end is provided with a hand-wheel 7 and that has its inner end threaded and fitted into a threaded perforation in the wall of the slide. Turning the hand-wheel 7 moves the slide along the guideway on the top of the bed toward the front or back, according to the direction of rotation of the wheel, Fig. 3.

Projecting upwardly from a part secured to the top of the bed are lugs 8, and supported by perforations (one of which is threaded) in these lugs is a threaded rod 9, that has its outer end provided with a finger-head 10 and its inner end arranged to engage the wall of the slide. By turning the head 10 in the proper direction the inner end of this rod 9 may be set in the correct position to stop the slide in the necessary position, Fig. 3.

A perforated hub 11 is attached to one side of the carriage, and in this turns a spindle 12, that on its outer end bears a crank 13 and on its inner end a spur-pinion 14. A rack 15 is attached to the under side of the carriage in position to be engaged by the teeth of the pinion. Turning the crank through the pinion and rack moves the carriage from side to side of the bed, Fig. 4.

In adjustable bearings in blocks 16 on the top of the carriage is a shaft bearing a grinding-wheel 17 and a pulley 18, around which the driving-belt for rotating the grinding-wheel is passed. Supported by the carriage and extending around a portion of the periphery and the faces of the grinding-wheel, near the periphery, is a water-shield 19. This shield is formed in two parts, which are hinged together so that the upper part may be turned back away from the periphery of the grinding-wheel, Fig. 4.

At the base of the column is a rotary pump 20. This pump may be rotated by passing a belt from a counter-shaft around a pulley 21 on the pump-shaft and the pulleys 22 on an arbor supported by the arms of a fork 23, mounted on the pump. A flexible tube 24 may be led from an opening in the casing of the pump to a nipple 25, that opens through the top of the water-shield, so that water may be forced to the periphery of the grinding-wheel, Fig. 1.

The upper face of the carriage preferably has low side walls, so as to form a tray 26 for collecting the water that drips from the wheel. A spout 27 is provided to direct the flow of water from this tray into a shallow receptacle 28, formed at the rear of the slide. From the receptacle in the slide there is a spout 29 to direct the water into the pan 30, secured to the rear of the bed. From this pan a pipe 31 leads to the supply-tank 32, from which water is drawn by the pump. By means of these connections no matter to what position (toward the front or back or toward either side) the grinding-wheel is adjusted a plentiful amount of water may be supplied to the periphery of the grinding-wheel, and after having performed its function the water will flow back into the supply-tank, Figs. 1 and 2.

The bed is extended outwardly toward the front and toward one side, and upon these extended portions are blocks 33, secured to the upper faces of which are bearing-posts 34, that hold the pivot-studs for a swinging frame 35. The bearing-posts are preferably so located and the pivot-studs so arranged that the axis of the swinging frame extends in a plane a little above the axis of the grinding-wheel, as illustrated in Fig. 1, at an angle of about forty-five degrees to the axis of the grinding-wheel, as illustrated in Fig. 2.

The upper part of the frame is arched, so as to give suitable room for the jaws which it supports and to provide a convenient portion for grasping and swinging the frame. The lower part of the frame near one end is provided with an ordinary dovetailed guideway 36. Movable upon this way is a slide 37, that has a long horizontal arm 38. This arm has a dovetailed way 39, and on this are an angular holding-jaw 40, a guiding-jaw 41, and a gage-plate 42. Each of these is adjustable along the way and is clamped in position by a thumb-nut 43, that turns upon a threaded stud, so as to tighten or loosen a clamp-plate 44. The jaw-slide 37 has a dovetailed guideway 45, by which the complementary jaw-slide 46 is retained. The front edge of this latter slide is preferably straight and forms the retaining-jaw 47, Figs. 2 and 7. Secured to the swinging frame 35 at the end of the guideway 36 is a plate 48, and held by this plate against longitudinal movement is a spindle 49. This spindle has a hand-wheel 50 on its outer end and is provided with a left-hand screw-thread 51 of one pitch and a right-hand screw-thread 52 of one-half the pitch of the other, Fig. 7. The screw-thread 51 fits a threaded perforation in a part of the jaw-slide 46 and the screw-thread 52 fits a threaded perforation in a sleeve 53, that is secured to the jaw-slide 37. When the hand-wheel is rotated, the jaw-slides, with the jaws, are moved toward or from each other, according to the direction of rotation of the wheel, the jaw 40 moving up half as fast as the jaw 47. The jaw 40 is adjusted, until it is in the correct position for properly holding the drills, by turning the sleeve 53, and then the sleeve is fastened against further movement, Fig. 7.

The guiding-jaw is a plate with an angular opening similar in shape to the angular opening of the holding-jaw and it is provided for assisting the support of drills of large size. The gage-plate is employed when a number of drills of the same length are to be ground and it is desired to facilitate their setting, so that they will be ground uniformly. Attached to the side of the lower part of the swinging frame is a finger 54, that is arranged to engage with the edge of one of the grooves, so as to correctly locate the cutting-lip that is to be ground with relation to the grinding-wheel, Fig. 2.

After one lip has been ground the jaws are loosened and the drill turned over and the other lip located by the finger and gage-plate in position to be ground.

Projecting upwardly from the bed is a post 55, and held by the top of this post is a rotatable disk 56. A curved runner 57 is secured to the under side of the swinging frame, so as to rest upon this disk, which forms an antifriction-support when the frame is swung and prevents any yielding of the jaws when a drill is being ground, Fig. 1.

The jaws are so located and arranged upon the swinging frame that they will hold drills that are placed between them with their axes in a plane slightly below and extending at an angle of about fifteen degrees with the axes of the swinging frame—that is, the axes of the drills will extend substantially at an angle of sixty degrees with the axis of the grinding-wheel.

In Fig. 9 the broken line 60 represents the axis of the swinging frame, the line 61 the axis of the drill at the commencement of grinding, and the line 62 the position that the drill-axis would occupy with relation to the axis of the wheel if the frame were rotated one hundred and eighty degrees. Each particle of the cutting-lip 63 of the drill that engages the peripheral face 64 of the grinding-wheel moves on the arc of a circle when the frame is swung. If the axis of the drill were concentric with the axis of the frame, a true cone would be ground upon the end of the drill; but as the axis of the drill is below the plane of the axis of the frame, so that the axis of the frame and the axis of the drill are eccentric as well as at angles with each other, the end of the drill between the grooves is ground so as to give clearance to the cutting-lip.

In Fig. 10 the point 60 represents the axis of the swinging frame, the point 61 the axis of the drill, the point 65 the outer edge of the cutting-lip, and the line 63 the cutting-lip of the drill. If the point 60 were in the same plane as the point 61—that is, if the point 60 were at 68—the axis of the frame and the axis of the drill would be in the same plane, and revolving the cutting-lip sixty degrees would carry the point 61 to 66 and the point 65 to 67 and the line 63 to the position of line 69. In other words, a true conical surface would be formed on the end of the drill. However, as the axis of the frame is above the plane of the axis of the drill the point 61 will in moving sixty degrees on the center 60 swing to 71, and the point 65 will swing to 72, and the line 73 will represent the cutting-lip. The angle 74 represents the amount ground from the outer edge of the drill—that is, it is the angle of clearance of the outer end of the cutting-lip—while the angle 75 represents the amount ground from the point end of the cutting-lip—that is, it is the angle of clearance of the point and of the cutting-lip. These angles of clearance, as shown, depend upon the distance the axis of the drill is below the axis of the swinging frame and the distance the axis of the drill at the point is to one side of the axis of the swinging frame.

The smaller drills do not need as much clearance as the larger drills, yet the angle of clearance should be in all sizes substantially the same. For the purpose of grinding clearance according to the size of the drills the angle that the lower part of the drill-holding jaw makes with relation to a horizontal plane is greater than the angle that the upper part of the jaw makes, so that the smaller the drill the more its axis will be raised toward the plane of the axis of the swinging frame, and as the angular jaw moves much slower than the other jaw the smaller drills will be held with their points nearer to the axis of the swinging frame, as well as in a higher plane. By these means the angle of clearance remains substantially the same for drills of all sizes; but of course the amount of clearance for large drills is greater than for small drills. The angle of clearance with this machine for the point end of the cutting-lips of these drills is somewhat greater than the angle of clearance of the outer edge of the cutting-lip, so that a point is formed that when put to use begins to drill immediately.

This machine can be adjusted so that the grinding will be very accurate, and the parts are firm, so that the lips that are ground will be perfectly formed. Drills of all sizes can be quickly put into the jaws of this machine and rapidly ground, so that the cutting-lips will have the correct clearance for the most efficient service, and a large number of drills can be rapidly ground alike.

I claim as my invention—

1. In a drill-grinding machine in combination, a bed, a grinding-wheel arranged to rotate on a horizontal axis, mounted upon the bed, a frame mounted upon the bed so as to oscillate on a horizontal axis that is higher than, and projects at an angle with relation to the axis of the grinding-wheel, and a drill-holder mounted upon the swinging frame so as to hold a drill with its axis extending horizontally at an angle with the horizontal axis of the frame and at a different angle with the horizontal axis of the grinding-wheel, substantially as specified.

2. In a drill-grinding machine in combination, a bed, a slide movable upon the upper surface of the bed, a grinding-wheel arranged to rotate on a horizontal axis and move with the slide, a frame mounted upon the bed so as to oscillate on a horizontal axis that is higher than, and projects at an angle with the axis of the grinding-wheel, and a drill-holder mounted upon the swinging frame so as to hold a drill with its axis extending horizontally at an angle with the horizontal axis of the frame, and at a different angle with the horizontal axis of the grinding-wheel, substantially as specified.

3. In a drill-grinding machine in combination, a bed, a slide movable upon the upper surface of the bed, a carriage movable with the slide and also at right angles thereto, a grinding-wheel arranged to rotate on a horizontal axis and move with the slide and with the carriage, a frame mounted upon the bed so as to oscillate on a horizontal axis that is higher than, and projects at an angle with the axis of the grinding-wheel, and a drill-holder mounted upon the swinging frame so as to hold a drill with its axis extending horizontally at an angle with the horizontal axis of the frame and at a different angle with the horizontal axis of the grinding-wheel, substantially as specified.

4. In a drill-grinding machine in combination, a bed, a rotary grinding-wheel mounted upon the bed, a swinging frame mounted upon the bed with its axis at an angle with the axis of the grinding-wheel, and an angular holding-jaw mounted upon the swinging frame, the holding sides of which jaw incline differently with relation to a horizontal plane whereby the smaller the diameter of the drill placed in the jaw, the nearer will its point be to the axis of the frame, substantially as specified.

5. In a drill-grinding machine in combination, a bed, a rotary grinding-wheel mounted upon the bed, a swinging frame mounted upon the bed with its axis at an angle with the axis of the grinding-wheel, and a pair of drill-holding jaws movable toward and from each other upon the swinging frame, one of said jaws having an angular opening, the sides of which opening incline differently with relation to a horizontal plane whereby the smaller the diameter of the drill placed in the jaw, the higher and farther in will be its axis, substantially as specified.

6. In a drill-grinding machine in combination, a bed, a rotary grinding-wheel mounted upon the bed, a swinging frame mounted upon the bed with its axis at an angle with the axis of the grinding-wheel, a jaw with an angular drill-holding opening and a retaining-jaw movably mounted on the swinging frame, and means for simultaneously moving the jaws toward and from each other at different rates of speed, substantially as specified.

7. In a drill-grinding machine in combination, a bed, a rotary grinding-wheel mounted upon the bed, a swinging frame mounted upon the bed with its axis at an angle with the axis of the grinding-wheel, a jaw with an angular drill-holding opening, a retaining-jaw, means for simultaneously moving the holding and retaining jaws toward and from each other at different rates of speed, and a guiding-jaw movable with the holding-jaw, said holding-jaw, retaining-jaw and guiding-jaw being mounted upon the swinging frame, substantially as specified.

8. In a drill-grinding machine in combination, a bed, a rotary grinding-wheel mounted upon the bed, a swinging frame mounted upon the bed with its axis at an angle with the axis of the grinding-wheel, a jaw with an angular drill-holding opening, a retaining-jaw, means for simultaneously moving the holding and retaining jaws toward and from each other at different rates of speed, said jaws being mounted upon the swinging frame, and a locating-finger mounted independently of the jaws upon the swinging frame, substantially as specified.

9. In a drill-grinding machine in combination, a bed, a rotary grinding-wheel mounted upon the bed, a swinging frame mounted upon the bed with its axis at an angle with the axis of the grinding-wheel, a jaw with an angular drill-holding opening, a retaining-jaw, means for simultaneously moving the holding and retaining jaws toward and from each other at different rates of speed, and a gage-plate moving with the holding-jaw, said jaws and plate being mounted upon the swinging frame, substantially as specified.

10. In a drill-grinding machine in combination, a bed, a rotary grinding-wheel mounted upon the bed, a swinging frame mounted upon the bed with its axis at an angle with the axis of the grinding-wheel, a jaw with an angular drill-holding opening, and a retaining-jaw movably mounted upon the swinging frame so as to hold a drill with its axis at an angle with and below the plane of the axis of the swinging frame, and means for simultaneously moving the jaws toward and from each other at different rates of speed, the angular opening of the holding-jaw being such that the smaller the diameter of the drill placed therein, the higher its axis will be, substantially as specified.

11. In a drill-grinding machine in combination, a bed, a grinding-wheel arranged to rotate on a horizontal axis upon the bed, a pump adjacent to the bed, a water-shield inclosing a portion of the grinding-wheel, connections between the pump and the water-shield, a frame mounted upon the bed so as to oscillate on a horizontal axis that is higher than and projects at an angle with the axis of the grinding-wheel, and a drill-holder mounted upon the swinging frame so as to hold a drill with its axis extending horizontally at an angle with the horizontal axis of the frame and at a different angle with the horizontal axis of the grinding-wheel, substantially as specified.

12. In a drill-grinding machine in combination, a bed, a slide movable upon the upper face of the bed, a carriage movable with the slide and also at right angles thereto, a grinding-wheel arranged to rotate on a horizontal axis and moved with the slide and with the carriage, a pump adjacent to the bed, a water-shield inclosing a portion of the grinding-wheel, a connection between the pump and the water-shield, a receptacle formed on the top of the carriage for collecting the water that drips from the grinding-wheel, a receptacle formed on the top of the slide for receiving water from the carriage-receptacle, a receptacle formed on the bed for receiving water from the slide-receptacle, a conductor leading from the bed-receptacle to a water-tank, a frame mounted upon the bed so as to oscillate on a horizontal axis that is higher than and projects at an angle with the axis of the grinding-wheel, and a drill-holder mounted upon the swinging frame so as to hold a drill with its axis extending horizontally at an angle with the horizontal axis of the frame and at a different angle with the horizontal axis of the grinding-wheel, substantially as specified.

13. In a drill-grinding machine, in combination, a rotary grinding-wheel mounted upon the bed, a swinging frame mounted upon the bed with its axis at an angle with the axis of the grinding-wheel, an angular drill-holding jaw and a curved runner mounted upon the swinging frame, and a rotatable disk supported by the bed beneath the curved runner, substantially as specified.

MOSES C. JOHNSON.

Witnesses:
HARRY R. WILLIAMS,
E. J. HYDE.